(12) United States Patent
Zhao (10) Patent No.: US 9,535,218 B1
(45) Date of Patent: Jan. 3, 2017

(54) FIBER OPTICS FIBER INLINE TAP MONITORING

(71) Applicant: Jing Zhao, Winchester, MA (US)

(72) Inventor: Jing Zhao, Winchester, MA (US)

(73) Assignee: AGILTRON, INC, Woburn, MA (US)

( * ) Notice: Subject to any disclaimer, the term of this patent is extended or adjusted under 35 U.S.C. 154(b) by 0 days.

(21) Appl. No.: 14/996,934

(22) Filed: Jan. 15, 2016

Related U.S. Application Data

(60) Provisional application No. 62/268,285, filed on Dec. 16, 2015.

(51) Int. Cl.
*G02B 6/42* (2006.01)
*G02B 6/255* (2006.01)
*G02B 6/28* (2006.01)
*G02B 6/35* (2006.01)

(52) U.S. Cl.
CPC .......... *G02B 6/2852* (2013.01); *G02B 6/2835* (2013.01); *G02B 6/355* (2013.01); *G02B 6/4201* (2013.01); *G02B 6/4214* (2013.01); *G02B 6/4286* (2013.01)

(58) Field of Classification Search
CPC ..... G02B 6/255; G02B 6/2551; G02B 6/2835; G02B 6/2852; G02B 6/42; G02B 6/4201; G02B 6/4204; G02B 6/4206; G02B 6/4214; G02B 6/4286; G01J 1/0425
USPC .......... 385/39, 48, 50–51, 95–98; 250/227.11
See application file for complete search history.

(56) References Cited

U.S. PATENT DOCUMENTS

| 2006/0198582 A1* | 9/2006 | Kakui | G02B 6/2826 385/48 |
| 2013/0087694 A1* | 4/2013 | Creeden | G01J 1/0425 250/227.11 |

* cited by examiner

*Primary Examiner* — Akm Enayet Ullah
*Assistant Examiner* — Michael Mooney
(74) *Attorney, Agent, or Firm* — Jie Tan; JT Law Services, PC (57) ABSTRACT

A method is disclosed to provide improved fiber inline optical power monitoring that eliminates the need for microbending the fiber or for fabricating micro-reflector on the fiber. A subset of light is tapped through an offset at a fusion-spliced upstream and downstream optic fiber, and is guided out of the downstream fiber by a light guide to a reflector and photo-sensing measurement. The disclosed inline fiber monitoring is thus cost effective, wavelength independence, reliable, stable, and also causes less light transmission loss.

7 Claims, 11 Drawing Sheets

FIBER OPTICS FIBER INLINE TAP MONITORING

CROSS-REFERENCE TO RELATED APPLICATIONS

This application claims the priority of the U.S. Provisional Patent Application No. 62/268,285, filed on Dec. 16, 2015, the entirety of which is thereby incorporated by reference and for all purposes.

BACKGROUND OF THE INVENTION

The present invention relates to a method for coupling optical energy out of an optical fiber, in particular, for fiber optical power monitoring used in mainly in the field of optical communication, optical fiber laser and optical fiber sensors.

Optics fibers have been widely used for increasing telecommunication speed and efficiency, where information is transmitted as light signals through light-transmitting glass or silica fibers. Specially designed optic fibers are also used as fiber optic sensors and fiber optic lasers. They are especially advantageous for long-distance communications, because light propagates through the fiber with little attenuation compared to electrical cables.

Figure 1:
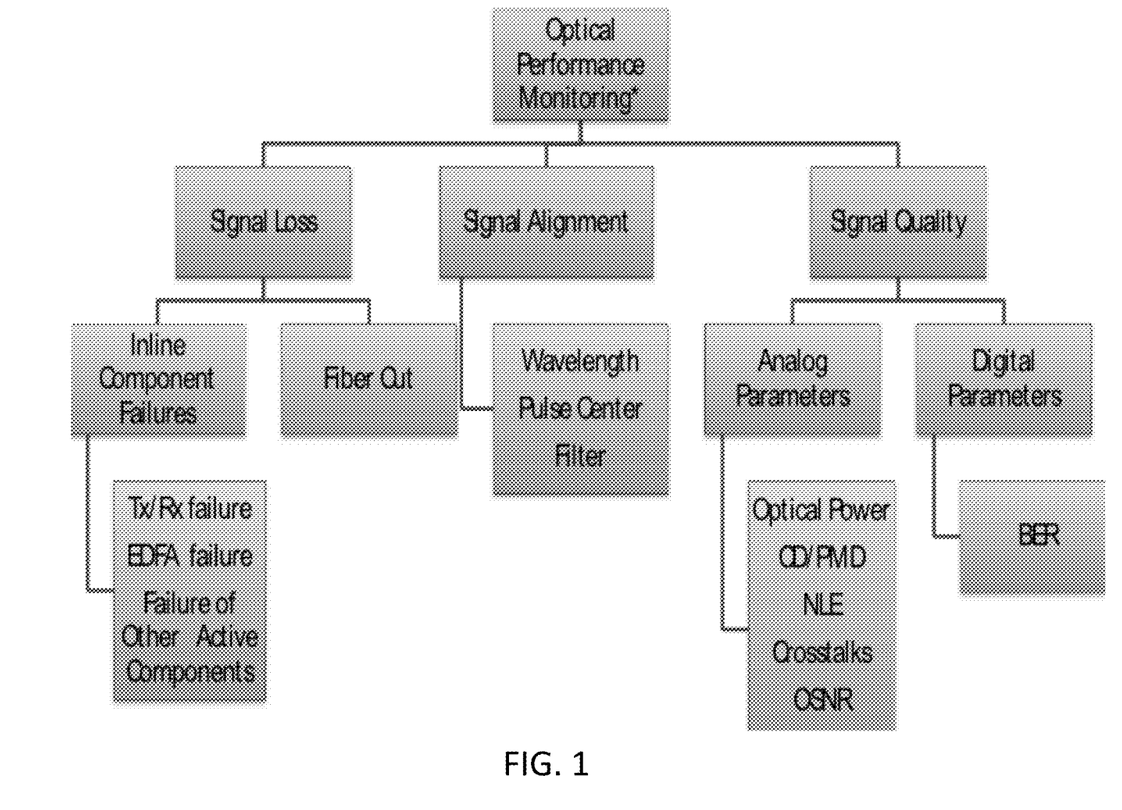
FIG. 1 shows a diagram of optical performance monitoring.

Optical performance monitoring is critical in providing and maintaining reliable optical networks. FIG. 1 shows some of the many aspects of monitoring light transmissions in the optical fibers. With respect to a signal dropout, it is necessary to immediately identify the optical signal and the place where the dropout has occurred. It is also necessary to check the signal intensity as well as the network connection status.

Figure 2:
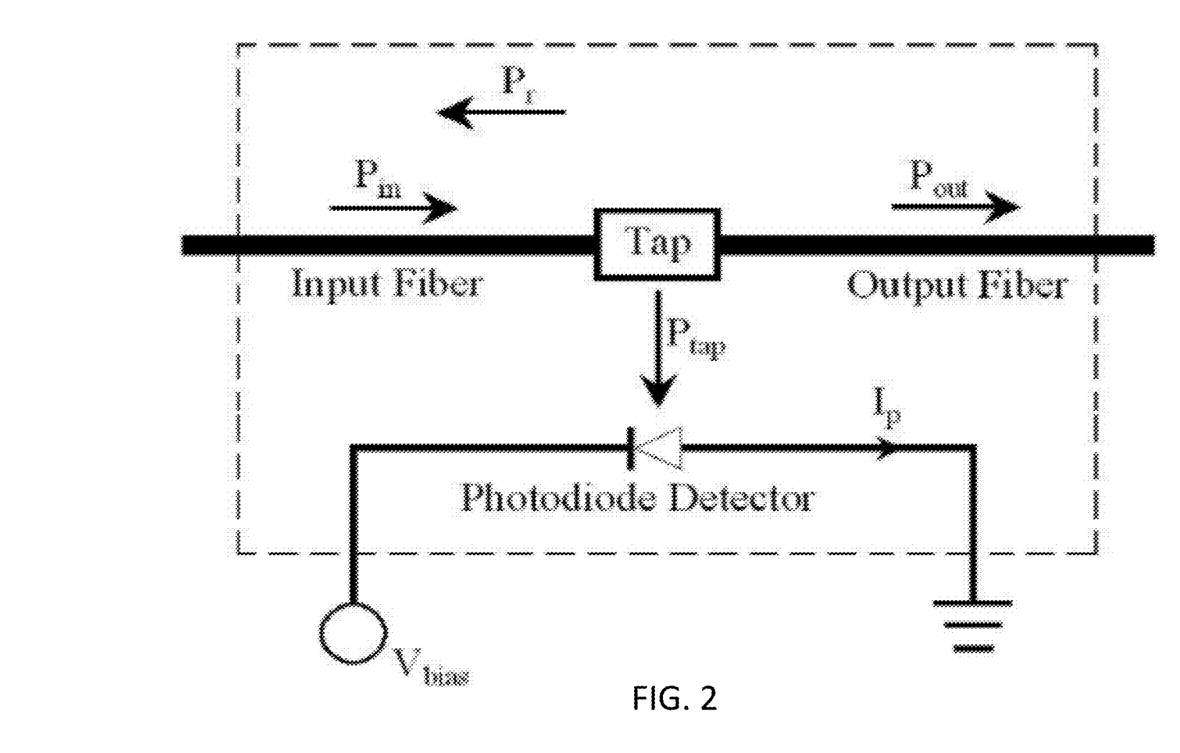
FIG. 2 shows a circuit diagram of tap monitoring method.

The traditional method for monitoring optical signals is through tapping the optical fibers by an optical coupler where some optical signals are taken out to be measured by a photo-diode detector (FIG. 2 for the concept). Fiber optical monitors are thus generally used for tapping partial light from the main transmission fiber in fiber optic circuitries. These monitors check the signal intensity as well as the existence/nonexistence of the connection for the optical signal. Fiber optical monitors are indispensable for the construction of highly reliable optical communication system. Optical tap monitors play key role in auto maintaining the optical signals amplifying ratio for an erbium doped fiber amplifiers.

Figure 3A:
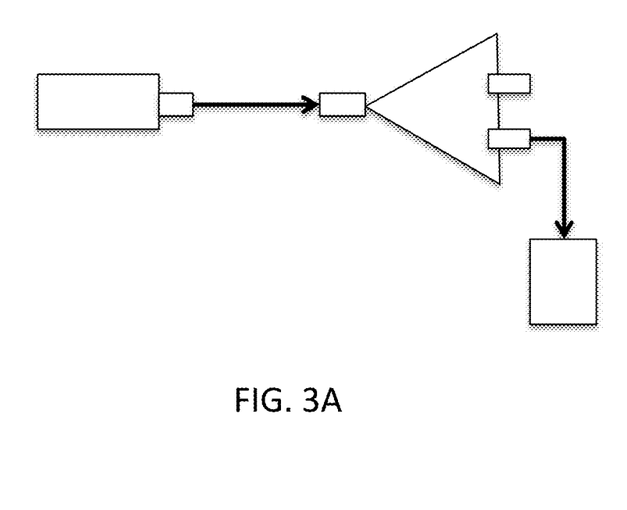
FIG. 3A shows a diagram drawing of optical splitter for optical monitoring.
Figure 3B:
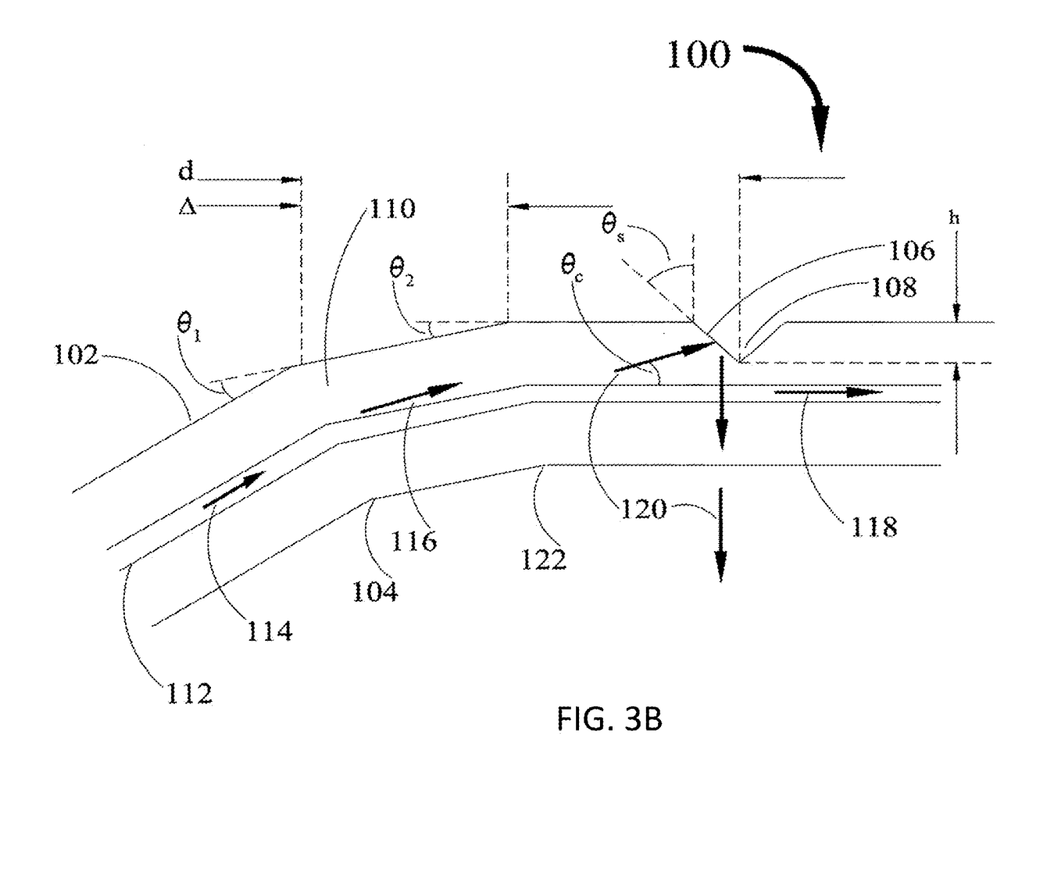
FIG. 3B shows a diagram drawing of the method of microbending and fiber notching for optical fiber inline tapping.

In a traditional optical coupler, the input signal optical fiber is spliced into two or more connections at the coupler (FIG. 3A). But this requires many numbers of mounting steps, resulting in large size, high optical loss, and high cost. It may also involve breaking the fiber into the air and re-coupling back into the fiber are also high loss and high cost. Several alternative improvements in attempting to make fiber inline tapping are made. For example, U.S. Pat. No. 7,116,870 B2, describes an optical monitor 100 that taps light from the main transmission fiber with two microbends 104 and 122 formed on the fiber using $CO_2$ laser radiation (FIG. 3B), the entirety of which is incorporated by reference for technology background information. With the downstream reflecting surface 106 formed in the cladding, main transmission light signals 114 will partially leak out light 116, among which light 120 is further direct to a photodetector by reflecting surface 106. The reflecting surface 106 is a notch created in the cladding by using laser ablation, at an angle of approximately 44 degrees to the perpendicular of the fiber axis to induce a total internal reflection for light incident on the surface. To reduce wavelength dependence of the tapping the two microbends need to be spaced apart by a distance approximately equal to one-half of the intermodal beat length. Although this design achieves fiber inline tap monitoring, it has major drawbacks of compromising fiber integrity due to micro-bending and notch ablation on the fiber. Optic glass fibers are well known to be prone to break upon micro-defects. This method thus requires high standard in precision and less error tolerance during fabrication.

Figure 3C:
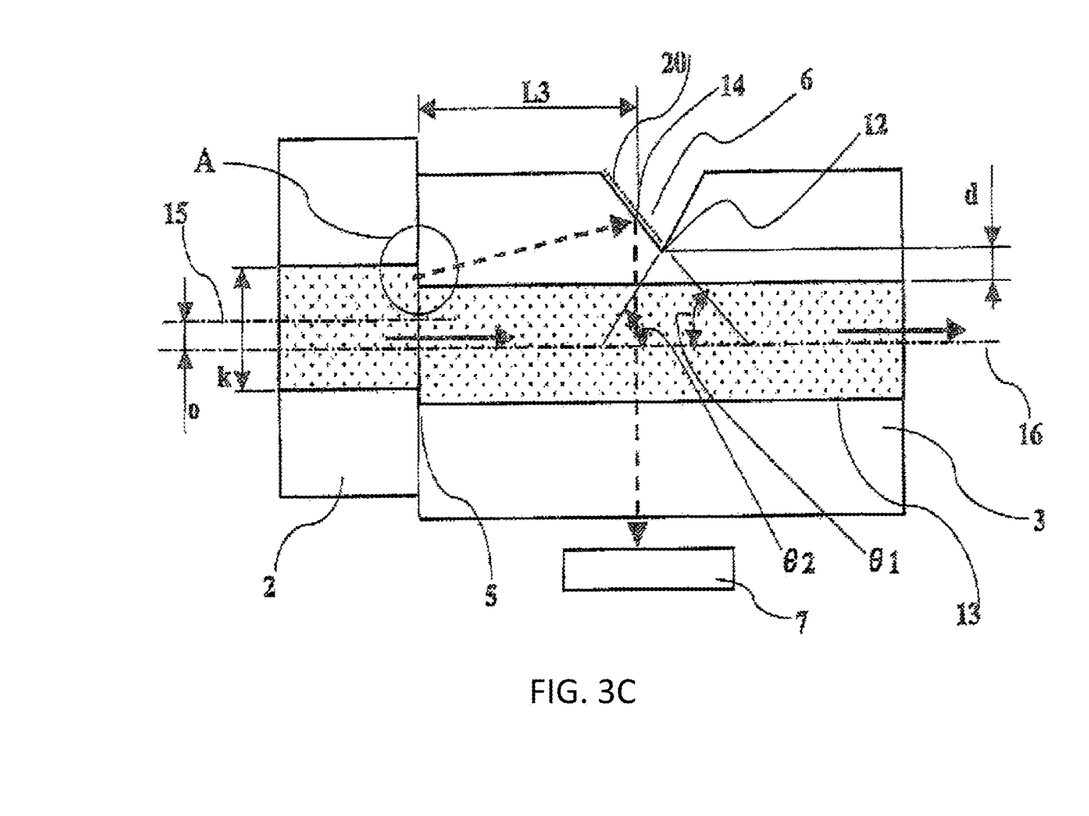
FIG. 3C shows diagram drawing of the method offset fusion splicing with fiber notching for optical fiber inline tapping.
Figure 3D:
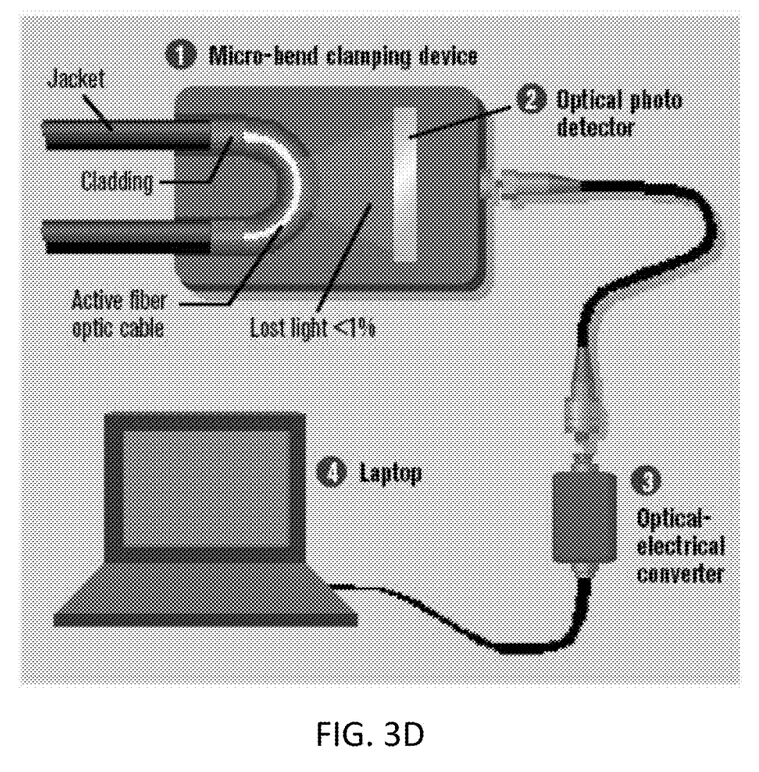
FIG. 3D shows diagram drawing of the method microbending clamping for optical fiber inline tapping.

Another fiber inline tap monitor design is disclosed in U.S. Pat. No. 7,412,137 B2, the entirety of which is incorporated by reference for technology background information. As shown in FIG. 3C, instead of bending the fiber, this design leaks out light from the main transmission fiber by fusion splicing two optical fibers with an offset 5 between the core optical axes 15 and 16. Coupled with a reflecting surface 6, tapped light from the off-set is redirected to a photo-diode 7. However, the reflector surface 6 is fabricated onto the fiber cladding by grading a notch on the fiber. To fabricate a notch on tiny optic fiber of only 125 micro-meter diameter remains a challenge. The notches also comprise the integrity of the fiber that can cause fiber to break when it is under environmentally induced thermal expansion and retraction. The reflecting surface introduces wavelength dependence because the tapped light needs to pass several surfaces of different reflection index and each adds optical interference. For instrument background, FIG. 3D shows an example electronic device system of optical monitoring in case of the microbended fibers.

This application discloses an improved method of optical fiber inline tapping and optical monitoring that alleviates the requirements of notching on the fiber.

SUMMARY

This application provides a fiber inline optical power monitoring method that eliminates the need for microbending the fiber or for fabricating micro-reflector on the fiber. The disclosed inline fiber monitoring is thus cost effective, wavelength independence, reliable, stable, and also causes less light transmission loss.

An optical power monitor in accordance with the present invention has two sections of optical fibers, each having a core in its center and a cladding layer around the core, one being disposed on an upstream side and one on a downstream side of light transmissions, respectively. The end surfaces are fusion-spliced to each other where their core optical axes offset from each other so that some of the upstream light transmissions leak out through the offset from the upstream optical core into the downstream cladding layer. A light guide is configured to attach to the fiber surface of the downstream-side optical fiber to allow the leaked light signals transmit out of the cladding layer of downstream optical fiber.

In an aspect of the embodiment, the light guide portion protrudes from the end surface of the downstream-side optical fiber core at the fusion splicing section, where the protrusion has an angled surface to reflect and redirect the leaked light onto a photo-diode of an in-line tap monitor.

In an aspect of the embodiment, an optical light guide is attached by optical index matching epoxy to the cladding surface of the downstream-side optical fiber and aligned to the splicing offset protruding. The optical light guide is made of optical transparent material with index reflection close or smaller than that of the fiber cladding and has one end polished with an angle to function as a reflector. Index matching epoxy is used to attach and optically couple the light guide/reflector onto the fiber to enable efficient light guiding.

With mature and improved fusion splicing technology, the precision of offset of upstream and downstream optical fibers are controlled through standard procedure and the efficiency of measuring and collection of the tapped light is improved since the tapped light needs not repeatedly travel though the optical fiber layers.

With no notch or bending in the fiber system the whole system's durability, reliability and efficiency will be significantly improved.

The reduced wavelength dependence of this invention is desirable for multiple wavelength signal transmission in optical fiber networks.

BRIEF DESCRIPTION OF THE DRAWINGS

The disclosed application will be described with reference to the accompanying drawings, which show important sample embodiments of the invention and which are incorporated in the specification hereof by reference, wherein.

DETAILED DESCRIPTION OF THE INVENTION

The numerous innovative teachings of the present application will be described with particular reference to presently preferred embodiments (by way of example, and not of limitation). The present application describes several embodiments, and none of the statements below should be taken as limiting the claims generally. For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help the understanding of embodiments of the invention. For optical fibers, the shadings in the diagram drawings do not necessarily mean to have a higher optical refractive index value, they indicate materials of different optical refractive indexes where optical refractive index value may properly apply.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition. The necessary enabling and best mode hardware and software systems involved for this application may be shown in the figures and background description, and described in the scientific literature and published scientific papers in the field, and may also be described in the references U.S. Pat. No. 7,116,870 B2 and U.S. Pat. No. 7,412,137 B2, these cited references are incorporated by reference for all purposes. For clarity reasons, the details of these systems and devices are omitted herein. An ordinary skilled person in the field of optic fiber and optic fiber communication knows and should have known these technologies and information that can be found in the field.

Figure 4A:
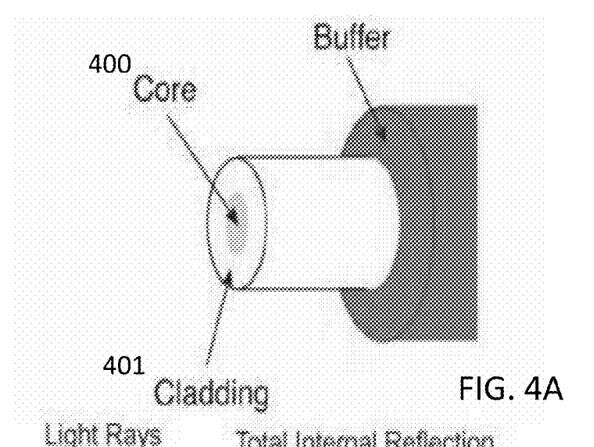
FIGS. 4A, 4B and 4C shows diagram drawing of an optical fiber and light transmission.
Figure 4B:
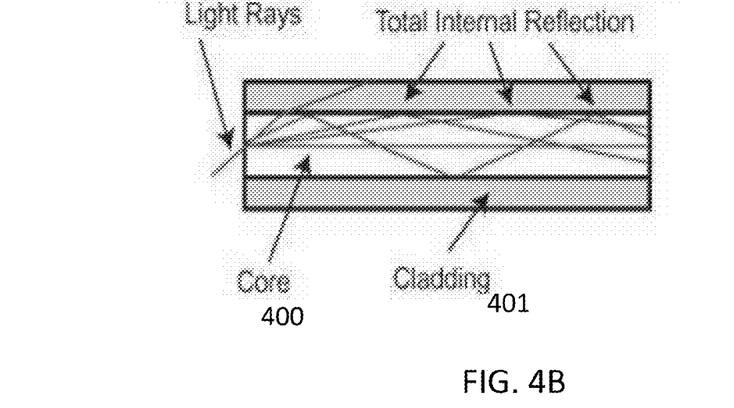
Figure 4C:
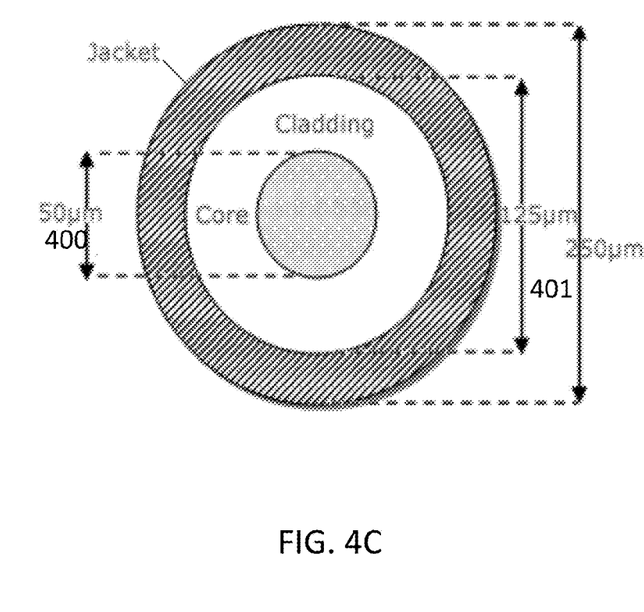

The terms "optics fiber" and "fiber optics" are used herein in the generic sense as they are used by engineers and scientists in the fiber optics telecommunication technology fields or other suitable technology fields. They typically are light transmitting cables that have a transparent core surrounded by a transparent cladding material with a lower index of refraction. FIGS. 4A, 4B and 4C depict some example optical fiber structures and the functional concept. The transparent "core" may include glass types, silica types, plastic types, and other special types such as fluorozirconate, fluoroaluminate, and chalcogenide glasses as well as crystalline materials like sapphire types, depending on the wavelength requirement or the specialized applications. The terms also include multi-mode fibers (MMF) and single-mode fibers (SMF). Multi-mode fibers may have a wider core diameter. The uses may include telecommunication network, fiber lasers, fiber sensors, power transmission and other suitable areas that require monitoring optical performance.

The term "cladding layer" of an optical fiber is used as it is generally used in the fiber optics fields, refers to the material layers that surround and are in intimate contact with the light transmitting "core" material, and which have a lower optical refractive index as they are calculated in the related scientific fields. The term "core" layer is used as it is generally used in the fiber optics fields, refers to the middle layer of a fiber optics that has high optical refractive index. The both the "core" and "cladding" layers may be made by adding a dopant to pure glass material; for "core" such as germanium (as a germanium tetrachloride gas), for "cladding" such as a bit of boron or fluorine. The germanium, which has 18 more electrons than silicon, acts as a dopant, the refractive index of the core glass is increased, although the attenuation is not affected; the boron or fluorine dopant which has less free electrons than silicon, reduces the refractive index.

The term "fusion spliced" or "fusion splicing" refers to the act of joining two optical fibers end-to-end using heat, the fused area is called "splice". To make sure that light passing through the fibers is not scattered or reflected back by the formed splice, the splice and the region surrounding it are made almost as strong as the virgin fiber itself. The source of heat is usually an electric arc, but can also be a laser, or a gas flame, or a tungsten filament through which current is passed.

Figure 4D:
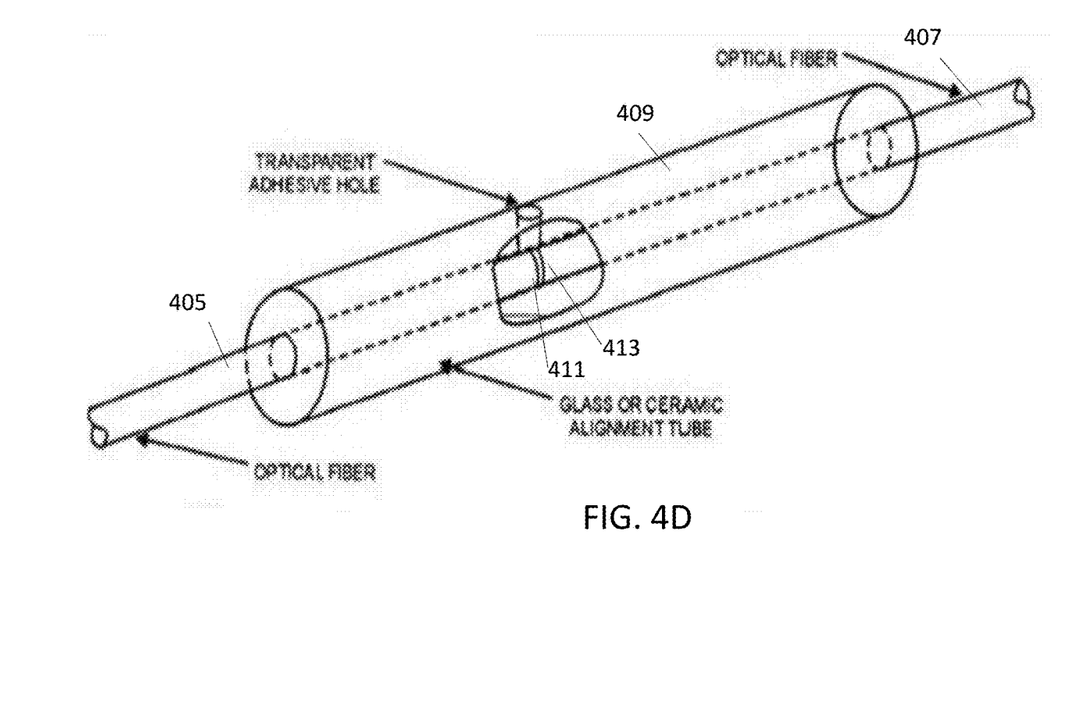
FIG. 4D shows diagram drawing of a perspective view of the fusion-splicing portion of two optic fibers.

FIG. 4D shows an example fusion splicing device and method, where optic fibers 405 and 407 are fused together at their end 411 and 413, aligned by a ceramic tube 409. It is contemplated and considered that many other experimentally available and commercially methods and devices may be used for fusion splicing.

The term "offset" refers to the distance between the core edge of an upstream fiber and the core edge of the downstream fiber at a splice section such that lights from the upstream fiber are leaked into the cladding layer of downstream fiber through the "offset surface" at a splice. The offset surfaces of the cores may have a curvature along the fiber longitudinal section that allows the leaked lights to transmit into the downstream fiber with a beam angle to be collected.

The term "reflector" refers to an optical polished surface with reflective coating or with a total reflection angle.

An example polished surface may have a measured roughness Ra value less than 2 nm as generally measured in the field, for example by a JIS B0601 instrument, the surface may be coated with a metal film with high reflectance, such as a gold (Au), silver (Ag), aluminum (Al) or copper (Cu) film. Metal film forming may be be performed by vapor deposition or sputtering techniques in the field.

Figure 5A:
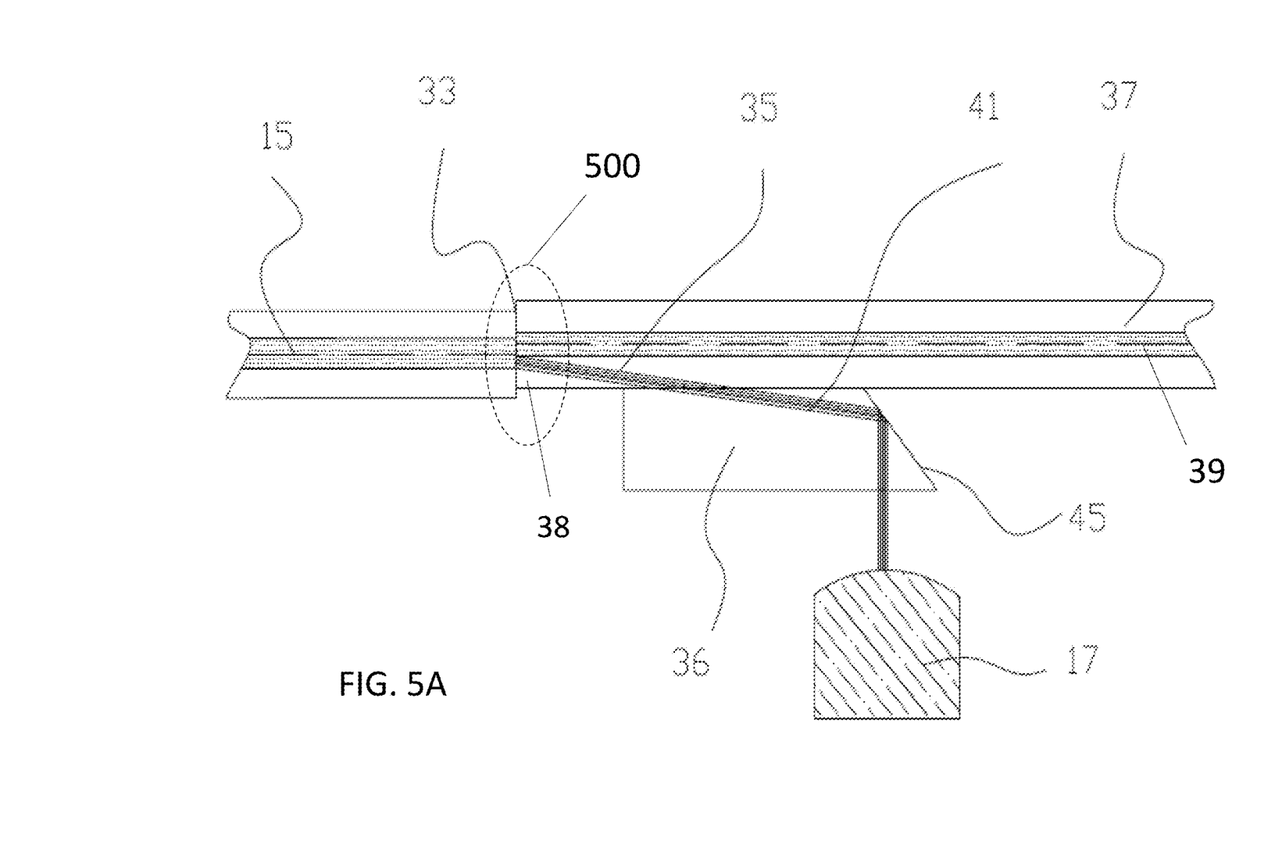
FIG. 5A shows diagram drawing of a sectional view of offset fusion-splicing fiber inline tapping method in accordance with this application.
Figure 5B:
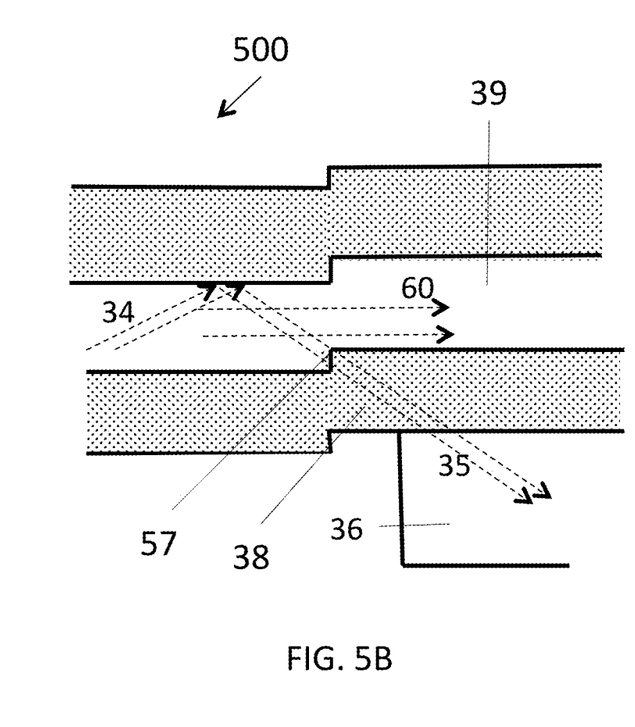
FIGS. 5B and 5C show diagram drawings of a sectional view of two alternative offset shapes of fusion-splicing portion of the fiber inline tapping method in accordance with this application.
Figure 5C:
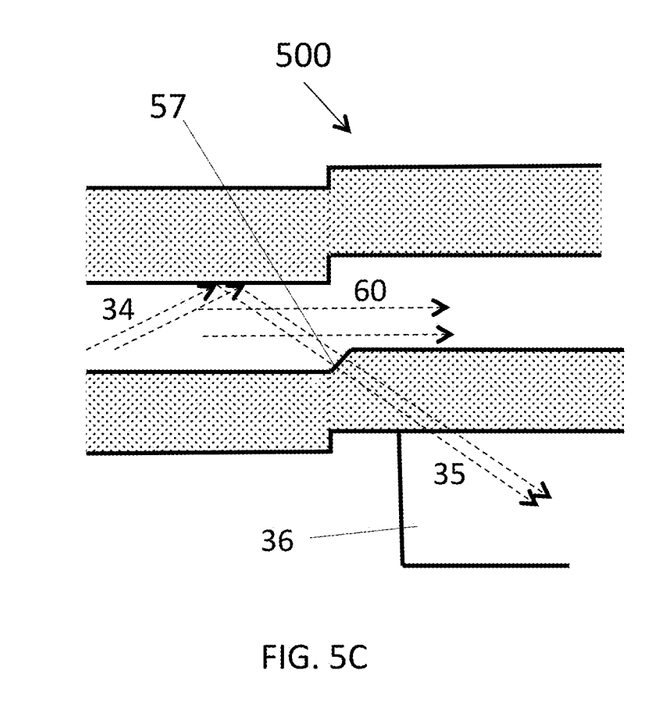

In reference to FIG. 5A, a longitudinal sectional view of an inline optical power monitoring is shown. The end surfaces of upstream-side optical fiber 11 and the corresponding light transmission downstream-side optical fiber 22 are fusion-spliced to each other, with an offset 59 between optical core 15 and optical core 39 (FIGS. 5B and 5C). The offset may be made less than 3 μm. The offset surface of upstream core 15 is located at the bottom cladding layer 38 of downstream fiber 22, and may be curved and protrude towards downstream side. Offset surface 57 may be made with variety of curvature angles and protrusions (FIGS. 5B and 5C).

An optical light guide 36 is attached to the cladding surface of the downstream-side optical fiber 22 and aligned to the splicing offset protruding. The optical light guide 36 is made of optical transparent material with index reflection close or smaller than that of the fiber cladding 37. Optical light guide 36 has one end polished with an angle to function as a reflector 45. Index matching epoxy is used to attach and optically couple the light guide/reflector 45 onto fiber 22 to enable efficient guiding the leaked light 35 out of fiber 22 as a light beam 41 without interference of reflections within the cladding layer and light guide 36.

Shown in FIG. 5B, light transmitted through the core of the light transmission upstream-side optical fiber 11 is divided into light 60 and light 35 by offset surface 57, and light 35 is then leaked through upstream offset surface 57 into the cladding layer 38 of the downstream-side optical fiber 22 and the main transmission lights 60 enters into the core 39 of the downstream-side optical fiber 22. The light 35 continues to transmit out of fiber 22 and into an attached light guide 36 without reflection interference from either cladding layer or reflection surface. The tapped light 35 is subsequently reflected near 90° by the light reflection surface of light guide 36 outside fiber 22 onto photo-diode 17 to be converted into an electrical signal.

The inventive design drastically reduces the fabrication complexity by eliminating the need to precisely making micro-bending or micro reflector onto the fiber. Moreover, the attachment of reflector surface can be made optically flat and its positioning is relaxed, improving light collection efficiency and performance stability. The tapped light is more efficiently guided out of the fiber cladding layer without unwanted interference effects of wavelength. As a result, optimized positioning of the reflector makes the optical monitoring method wavelength independent.

An optical power monitor of the present invention can be provided as a single-channel optical power monitor having an optical fiber with a light reflection surface and a photo-diode housed in one case. A multi-channel optical power monitor assembly can also be provided by arranging a plurality of optical power monitors in parallel with each other. The size of the assembly can be reducing by using one multi-channel photo-diode in place of a plurality of photo-diodes.

Figure 6:
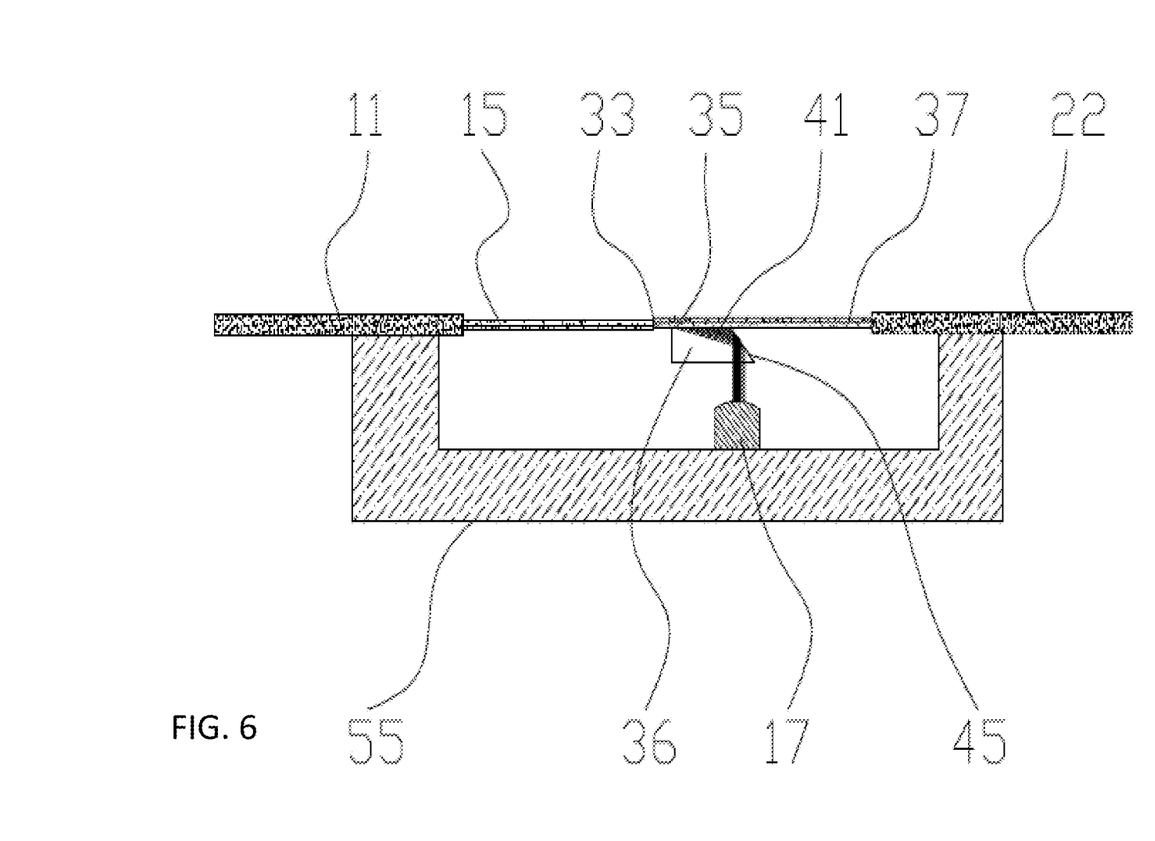
FIG. 6 shows a diagram drawing of a sectional view of offset fusion-splicing fiber inline tap monitoring in accordance with this application.

Preferably, an optical power monitor of the present invention can be packaged onto a base made of thermal expansion matching material, such as ceramic and glass as shown in FIG. 6 as an example. It has a first support block holding the upstream-side optical fiber on the upstream side of the fusion splicing portion, and a second support block holding the downstream-side optical fiber on the downstream side of the light reflection surface. The light guide/reflector is attached to the fiber by epoxy and the reflector is directed toward the photo-diode.

Numerous characteristics and advantages of the invention have been set forth in the foregoing description, together with details of the structure and function of the invention, and the novel features hereof are pointed out in the appended claims. The disclosure, however, is illustrative only, and changes may be made in detail, especially in matters, shape, size, and arrangement of parts, within the principle of the invention, to the full extend indicated by the broad general meaning of the terms in which the appended claims are expressed.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed:

1. A method for fiber inline tap monitoring of light signal transmission in an optic fiber having a core and a cladding layer, comprising the steps of:
   providing a first end surface from an upstream optical fiber, said first end surface having a first core area and a first cladding area;
   providing a second end surface from a downstream optical fiber said second end surface having a second core area and a second cladding area;
   fusion-splicing said first end surface with said second end surface, wherein said first core area fuses with said second core area with a first offset area that fuses with said second cladding area, and said first cladding area fuses with said second cladding area with a second offset area that fuses with said second core area, whereby upon light signals transmitting through said first end surface, a leaked set of light signals leak through said first offset area and into a cladding layer of the downstream optical fiber;
   providing a light guide portion having a refractive index value less than that of the cladding layer of the downstream optical fiber, attached to said downstream optical fiber, aligned with said first offset area, configured to guide said leaked set of light signals outside of said downstream optical fiber; and providing a reflective surface that redirects said leaked set of light signals onto a light sensing photo-diode for measurement.

2. The method of claim 1, wherein said first offset area is an offset about 0.01 times to 0.52 times that of the first core area's diameter.

3. The method of claim 1, wherein the said light guide is made of an inorganic transparent glass.

4. The method of claim 1, wherein said light guide is made of an organic transparent epoxy.

5. The method of claim 1, wherein said light guide is mounted on a support material made of glass, ceramic, silicon or kovar.

6. The method of claim 1, wherein the said light guide is attached to the downstream optical fiber by a transparent epoxy.

7. The method of claim 1, wherein said light reflective surface has a light reflective angle between 0.01 to 170 degree.

\* \* \* \* \*